United States Patent
Cunningham et al.

(10) Patent No.: US 6,366,294 B1
(45) Date of Patent: Apr. 2, 2002

(54) SNAPSHOT DAMAGE HANDLING FOR RENDERING OBJECTS IN A ZOOMING GRAPHICAL USER INTERFACE

(75) Inventors: Kathleen Cunningham, New York; Kenneth Herndon, Suffern, both of NY (US)

(73) Assignees: Sony Corporation (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/329,572

(22) Filed: Jun. 10, 1999

(51) Int. Cl.[7] ............................................... G06T 3/40
(52) U.S. Cl. ..................................................... 345/666
(58) Field of Search ................................ 345/427, 439, 345/666

(56) References Cited

U.S. PATENT DOCUMENTS

| | | |
|---|---|---|
| 5,341,466 A | 8/1994 | Perlin et al. |
| 5,448,686 A * | 9/1995 | Borrel et al. |
| 5,596,346 A | 1/1997 | Leone et al. |
| 5,596,690 A | 1/1997 | Stone et al. |
| 5,615,384 A | 3/1997 | Allard et al. |
| 5,617,114 A | 4/1997 | Bier et al. |
| 5,732,230 A | 3/1998 | Cullen et al. |
| 5,825,368 A * | 10/1998 | Wilks |

OTHER PUBLICATIONS

The Source for Java Technology [online]. Retrieved from the Internet: <URL: http://java.sun.com>. Three pages (publication date unknown, printed Sep. 12, 2001).

* cited by examiner

*Primary Examiner*—Jeffery Brier
(74) *Attorney, Agent, or Firm*—Lerner, David, Littenberg, Krumholz & Mentlik, LLP (57) ABSTRACT

A computer interface is provided for zooming representation objects in a zooming graphical user interface. Information is displayed as a collection of zooming spaces containing graphical objects that may be manipulated with interactive input devices. The damage handling method of the invention limits data processing undertaken to make the result of user manipulations apparent. A copy of least one instance variable defining a visual characteristic for each zooming object is stored as snapshot data prior to user manipulation. Ensuing modification requiring re-rendering is determined by comparison of snapshot data and current object data. The region to be re-rendered is determined by a bounding box that circumscribes the bounding boxes of the snapshot data and the current object data. In this manner, the region to be re-rendered need only be calculated once, after a series of user manipulations of an object is complete. Timing of the damaging necessary to make the result of user manipulation apparent is also selectively controlled. A series of modifications may be made to the displayed zooming space and stored by a region manager before any modifications are made apparent by explicitly calling a damage method. In addition, since the zooming graphical user interface is implemented in a platform-independent object-oriented language, the interface is portable and modular. providing increased flexibility, efficiency and functionality.

19 Claims, 8 Drawing Sheets

502 In its initial state, the circle has no snapshot data.

504 At the beginning of the call to move (and scale) the circle, a "snapshot" of the original object data is taken.

506 During "damage" processing, the references to the object data and the snapshot data are temporarily swapped in order to determine the region.

508 When the damage processing is complete, the snapshot data is either reset to null or set to be "invalid" so that the memory may be re-used.

SNAPSHOT DAMAGE HANDLING FOR RENDERING OBJECTS IN A ZOOMING GRAPHICAL USER INTERFACE

CROSS REFERENCE TO RELATED APPLICATIONS

This application is related to the following:

U.S. patent application Ser. No. 09/211,666, entitled Polymorphic Event Handling for Zooming Graphical User Interface, filed Dec. 14, 1998;

U.S. patent application Ser. No. 09/211,280, entitled Interchangeable Pick Handler for Zooming Graphical User Interface, filed Dec. 14, 1998;

U.S. patent application Ser. No. 09/211,669, entitled Object Oriented Zooming Graphical User Interface, filed Dec. 14, 1998;

U.S. patent application Ser. No. 09/223,934, entitled Click-Through Pick Method For Group Objects In A Zooming Graphical Interface, filed Dec. 31, 1998;

U.S. patent application Ser. No. 09/239,652, entitled System and Method for Providing Zooming Video, filed Jan. 29, 1999;

U.S. patent application Ser. No. 09/240,905, entitled Singleton/Universe Based Zooming Space for Graphical User Interface, filed Jan. 29, 1999;

U.S. patent application Ser. No. 09/240,416, entitled Zooming Space Grid for Graphical User Interface, filed Jan. 29, 1999;

U.S. patent application Ser. No. 09/245,205, entitled Apparatus and Method for Cropping an Image in Zooming Graphical User Interface, filed Feb. 5, 1999;

U.S. patent application Ser. No. 09/261,529, entitled System and Method for Providing Zooming Video Capture, filed Mar. 3, 1999;

U.S. patent application Ser. No. 09/321,654, entitled Color Scheme for Zooming Graphical User Interface, filed May 28, 1999;

All of the above listed patent applications are incorporated into this disclosure by reference.

FIELD OF THE INVENTION

This invention relates generally to a graphical user interfaces in a computer system and more specifically, to damage handling for rendering zooming objects in zooming graphical interfaces able to manipulate items of information, which may be displayed in multiple levels of magnification to users of computer systems.

BACKGROUND OF THE INVENTION

The available display screen area on a computer monitor has become increasingly inadequate for certain computer applications in terms of the presentation of the complex information and control options typical in advanced computer systems. In this regard, computing systems of the prior art have attempted to provide various solutions to address the problem of limited display screen area.

For example, windowing systems divide a screen into multiple tiled or overlapping display areas, resembling sheets of paper on a desktop, with one window in the foreground and others in the background. These windows remind the user that other information and control options are readily available to be brought to the foreground at the click of a mouse on an unobscured point in the window containing the desired material. However, such systems allow only a limited number of windows to be open and only the foreground window to be operable at any one time. In addition, information within a window that does not fit on the window's display screen area must be scrolled using an input device in order to access chosen information. Since objects that a user wants to access are concealed until explicitly opened and scrolled to, systems of this type deprive the user of 'peripheral' vision of all the available information.

Another attempt to increase displayed information and control options is the use of hierarchical menuing through a sequence of display screens, offered to the user as a cascade of submenu windows or a single designated screen area which is overwritten for each submenu. Both of these display methods have significant drawbacks. Typically, advanced computer systems involve complex hierarchical information structures organized into menus representing decision trees. Attempts to maximize the display screen area by abbreviating menuing options create systems less amenable to use by non-experts, requiring extensive training to produce expert users, because, in many cases, the top levels of a menu do not suggest options at sub-levels. Moreover, the graphical representations of large hierarchical structures often occupy multiple display screens, requiring extensive scrolling to access material not visible on the limited display screen. Further, cascaded windows introduce screen clutter and prevent the user from seeing all of the cascaded information simultaneously, while presentation of information in a single designated screen area removes information from the display each time a write operation occurs. Both methods introduce the possibility for a user to lose track of the current location within the menu hierarchy. As an additional drawback to these methods, diversified data collections not easily described by a well structured hierarchy are represented even less adequately.

A somewhat different method for accessing information available on a computer display for providing ease of information access to a user is altering the size of information on a display, i.e. "zooming". However, conventional zooming graphical user interfaces typically implement static hard-coded systems, which are inflexible in various aspects, suffering from limited and inefficient capabilities while lacking portability and modularity. Another facet of prior art zooming graphical user interfaces that reduces such interfaces' utility is inefficient damage handling. Damage handling refers to the process of re-rendering so that the result of a user manipulation becomes visible. A user may manipulate a zooming object, thereby modifying one or more characteristics thereof and consequently altering a zooming space. Such a manipulation may affect not only the display of the zooming object being manipulated but other zooming objects positioned in the zooming space. For instance, if a particular zooming object is deleted, other zooming objects positioned below the deleted object may now become unobscured and visible. The re-rendering of an entire zooming space in response to such a user manipulation is more computationally intensive than necessary to accomplish the goal of making a user modification visible. Thus the prior art re-renders only those regions of a display which are affected by the user manipulation, limiting the region to be re-rendered to the bounding box of the manipulated object. It should be understood that user manipulation requiring damage handling may take the form of zooming, moving, deleting, or performing other activities on zooming objects in a zooming space.

Calls to the operating system image renderer represent the "choke point" of a zooming graphical user interface. A region manager of the zooming graphical user interface allows such calls to be minimized in order to increase the robustness of the system hosting interface. The region manager accumulates the coordinates for regions of the display that are in need of re-rendering. At some later time, a damage handling process calculates the resultant display for each region of the display stored in the region manager. The prior art accomplishes damage handling in several basic steps. First, the current bounding box of an object that is to be modified is sent to the region manager. Then, the object is manipulated causing a modification. Next, the object's modified (i.e., new) bounding box is sent to the region manager. The display parameters for those objects encapsulated by a given bounding box and thereby affected by a modification are calculated when the region manager is flushed during system idle time. In other words, the display parameters for each bounding box stored in the region manager are recalculated and repainted during system idle time. This process typically occurs for each discrete user manipulation to a zooming object (e.g., object coloring, object move, etc.) and may affect objects located on various zooming surfaces. For example, if a zooming object were to be colored and moved, the damage handling would be invoked to accumulate affected regions for the color manipulation and then for the move manipulation.

However, such damage handling still tends to be computationally intensive, thereby resulting in slower system response times, as well as slower refresh frame rates. Intense computational demands placed on the computer system hosting the zooming graphical user interface are manifest as sluggish command response and attendant degradation of various aspects of the computer system operation. Consequently, the effectiveness of not only the zooming graphical user interface but that of other applications active on the computer system is reduced. These limitations and limited capabilities form serious impediments to the widespread dissemination and efficient utilization of complex zooming computing systems. Thus, comprehensive utilization of zooming graphical user interfaces is discouraged.

SUMMARY OF THE INVENTION

Accordingly, it is an objective of the invention to provide a zooming graphical user interface that provides improved flexibility and more efficient functionality. To that end, a computer interface is described that provides for the manipulation of objects using a zooming graphical user interface implemented with an object-oriented platform-independent programming language. The zooming graphical user interface is employed by object-oriented drawing applications and other zooming applications that logically organize graphical data. Graphical data in the interface of the invention is not static but is displayed as a zooming universe of graphical objects which may be manipulated with interactive input devices causing corresponding alteration to the graphical data defining the manipulated graphical object. The interface permits a user to easily pick objects in a zooming universe for display at an altered level of magnification (and, accordingly, a re-rendering of a portion of the zooming space), thereby allowing the user to quickly hone in on desired information. Other user manipulation activities such as moving, adding, deleting, or coloring a zooming object similarly require a re-rendering of a portion of the zooming space to make the result of user manipulation apparent (i.e., visible).

The damage handling process of the invention efficiently calculates display parameters for regions of a zooming space affected by user interaction with zooming objects. According to the invention, the entire zooming space need not be re-rendered in response to a user manipulation in order to make the resultant modification visible to the user. Re-rendered areas of the zooming space are selectively limited to those regions of the display screen that are affected by a user modification. Furthermore, calculation of the parameters for the modified display is executed only after a series of manipulation operations is completed, thereby reducing the concomitant data processing demand on systems resources.

The zooming engine of the invention stores, as part of each zooming object, certain snapshot data—i.e., a copy of certain visual characteristics of the graphical object—such as whether and where the object is visible. The snapshot data for the object includes but is not necessarily limited to variables that define a bounding box, a minimum displayable zoom level, a maximum displayable zoom level, and a display layer identifier. The layer identifier provides semantic ordering of objects positioned on a zooming surface. Zoom levels indicate the range of levels at which a zooming object is visible. The bounding box defines the smallest of a predetermined geometric shape that circumscribes the object and is used to determine the occurrence of user interaction with a zooming object. It should be understood that any number of shaped bounding boxes may be used by the invention, although the preferred bounding box is a rectangle.

The first user manipulation of a zooming object in the interface of the invention causes snapshot data to be stored for the zooming object. Subsequently, a series of manipulation operations which may result in a change to visible characteristics of the zooming object may be undertaken. The damage handling method of the invention, which determines the region of the zooming space that must be re-rendering to make the modifications visible, is explicitly invoked after the series of manipulations is complete. The general damage handling process first determines that a visual characteristic of the object was modified by comparison of snapshot data and the corresponding current data for the object. A bounding box that circumscribes the bounding boxes of the snapshot data and the current object data is then calculated. This bounding box defines the repaint region according to the damage handling process of the invention and modified display parameters for this region are calculated. The singular calculation of display parameters for this selectively limited repaint region reduces data processing and results in faster system response times and refresh frame rates as compared to prior art zooming graphical user interfaces.

In accordance with the singular calculation aspect of the invention, the zooming graphical user interface may process one or more sets of modifications made to the displayed zooming space before making any of the modifications apparent. A zooming object being manipulated by a user may be modified multiple times (or in multiple respects) before the user finishes manipulating the object and requires that the object be rendered. Instead of calculating a modified display region automatically in response to each of several related modifications, an entire set of changes may be processed completely prior to calculation of the display region to be re-rendering.

Coordinates for regions of display affected by a modification are buffered by a region manager. However, in order to make such modifications visible to a user, a damage method that renders the zooming object (or a variation that causes the displayed view of the zooming space to be re-rendered) by way of the operating system image renderer must be explicitly called. The method determines a single affected region circumscribing the accumulated regions prior to invoking the image render. The described approach reduces the number of invocations made of the operating system rendering interface. The process of the invention reduces both the number of times the objects' bounding box must be calculated and the number of regions which are accumulated by the region manager prior to a repaint of the display. This damage handling method serves to limit the processing demands placed on the computer system hosting the zooming graphical user interface.

BRIEF DESCRIPTION OF THE DRAWINGS

A better understanding of the invention, and additional objects, features and advantages of the invention, will be apparent to those skilled in the art upon reference to the following detailed description in conjunction with the accompanying drawings, in which.

DETAILED DESCRIPTION

A zooming graphical user interface according to the invention is able to display graphic representations of objects from stored information, the magnification of which representations the user is able to alter. Graphical objects may be manipulated with interactive input devices, thereby permitting the user to hone in on desired information quickly while making efficient use of computer resources. Magnification, also know as "zooming in", displays objects in larger size and/or more detailed. Reduction, also know as "zooming out", displays objects in smaller size and/or less detail. As objects are zoomed in and out, the level of detail increases and decreases causing objects to appear and disappear from view.

The invention provides flexibility and efficiency in the disclosed interface, which provides for implementation of a zooming graphical user interface using an object-oriented platform-independent programming language in conjunction with a corresponding virtual machine. With the interface of the invention, graphical data is displayed as a zooming universe of graphical zooming objects which may be manipulated with interactive input devices, such manipulation causing corresponding alteration to and re-rendering of the graphical data defining the manipulated zooming object. The system of the invention selectively limits the region of the zooming space caused to be re-rendered and selectively controls the timing of the re-rendering necessary to make the result of user manipulation apparent.

Representational data or snapshot data, which defines certain visual characteristics of an object, is stored for each graphical object prior to user manipulation of the zooming object. Upon an explicit call to the object's damage method, a repaint region is determined by the bounding box necessary to circumscribe the bounding boxes of both the current object data and its snapshot data. One or more sets of modifications may be made to the displayed zooming space before making any modifications apparent. Data representing the modifications is stored by a region manager and must be explicitly called to effect a re-rendering of the altered zooming space. The damage handling method of the invention efficiently calculates modified display regions thereby reducing the processing demands placed on the computer system hosting the zooming graphical user interface. These abilities result in faster system response times and refresh frame rates as compared to prior art interfaces, while enabling all requisite zooming graphical user interface functionality.

Computer Architecture

Figure 1:
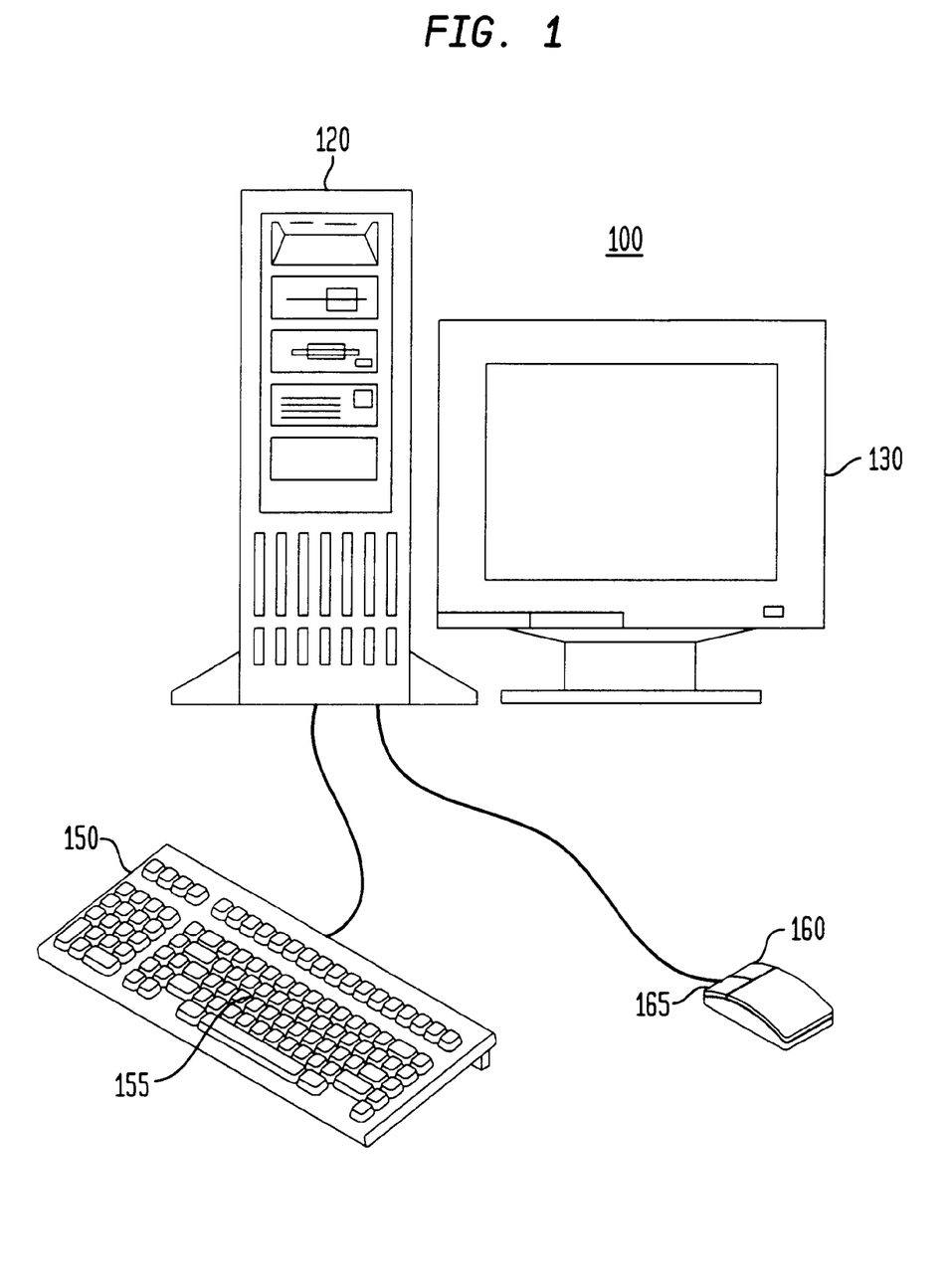
FIG. 1 is a schematic diagram illustrating a conventional computer system.

FIG. 1 illustrates an exemplary computer system 100 which is adaptable for implementing the zooming graphical interface system according to the invention. The computer system 100 includes a main housing 120 connected to a monitor 130 and interactive input devices, in this example a keyboard 150 and mouse 160, which include switches 155 and 165 having positive on and positive off positions for generating signals to the system 100. The main housing 120 includes various items (not shown in FIG. 1) that are typically used in a computer system 100. By way of example, these elements may be a processor, ROM and RAM memory, cache memory, a hard disk storage device, a floppy disk drive, a storage tape drive, graphics and audio cards, a network interface card, and a power supply, all interconnected using a conventional architecture.

A computer system 100 configured as such provides visual output through a monitor 130 and audio output through speakers (not shown), and receives input through a keyboard 150, mouse 160, and possibly a microphone (not shown). The user can interface with the computer system 100 in conventional fashion, such as by positioning the screen cursor on a desired object using an interactive input device, such as mouse 160, and clicking (depressing a button of) the interactive input device, such action providing input to the system and identifying/selecting the desired object for further activity. For example, the user may use the mouse 160 to move a cursor about a graphical display and position the cursor over an icon for an application on the graphical display shown on the monitor 130. The user may then provide input to the system using the mouse 160 by a double click of a mouse switch 165 while the cursor is on the icon, such action typically operating to launch the application represented by the icon (i.e., cause it to be executed). The display and functionality may be referred to as a graphical user interface.

Although the illustrated computer system 100 is of the desktop type, it is noted that the invention is equally applicable to other computer system types, such as the lap-top type and palm type. Additionally, although the preferred embodiment implements a mouse for moving a cursor and providing input, it is noted that various technologies for accepting input and displaying output will evolve, and that such evolving technologies are contemplated by the invention. For example, instead of mouse and keyboard commands, audio commands may ultimately be used to update the display. Furthermore, although a personal computer system is described in connection with this embodiment, the invention encompasses other computer system environments. For example, a set top box for a television can include a processor and memory, and can be equipped with a zooming electronic programming guide driven by the zooming engine and corresponding functionalities of the invention. In such embodiments input may, for example, be received from a remote commander using infrared signals, in lieu of mouse commands. These and other alternatives will be recognized by the ordinarily skilled artisan.

Figure 2:
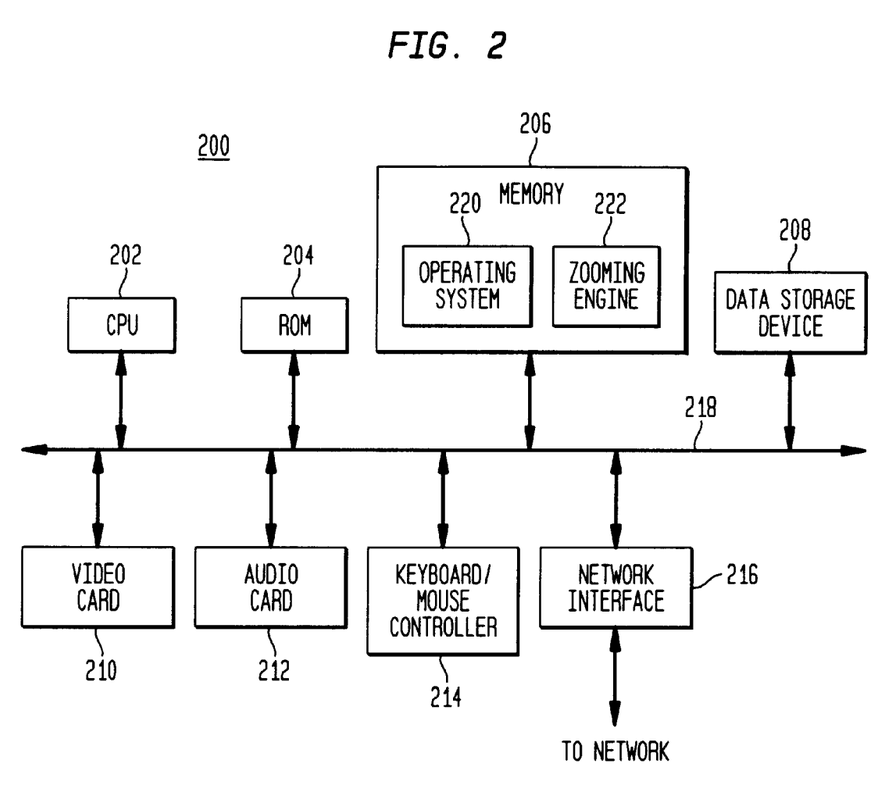
FIG. 2 is a block diagram illustrating a computer system having an embodiment of a zooming engine in accordance with the invention.

The block diagram of FIG. 2 illustrates an embodiment of a computer 200 (the portion of the system 100 typically found in the main housing 120) that includes a CPU 202, ROM 204, memory 206, data storage device 208, video card 210, audio card 212, keyboard/mouse controller 214, and network interface 216, each coupled to a bus 218 in conventional fashion. The CPU 202 is a conventional processor, such as the PENTIUM™ type provided by Intel Corporation of Santa Clara, Calif. The CPU 202 executes instructions, such as those provided in ROM 204 and/or memory 206. ROM 204 is a read only memory, which retains its stored information even while it is disconnected from a power supply. The ROM 204 may, for example, store instructions for a boot up sequence. Memory 206 is preferably volatile memory for storing instructions and information used during ordinary operation, such as those provided in the computer operating system. The data storage device 208 provides long term data storage, and is preferably a magnetic or magneto-optic hard disk device. The video card 210 and audio card 212 respectively provide the interface between the computer 200 and the monitor and speakers. The keyboard mouse controller 214 interfaces the computer 200 and the keyboard and mouse that are used to provide input to the computer 200. The network interface 216 is a conventional network interface card that interfaces a local network line and the computer 200. The network interface card may be a conventional ethernet card, or may be a multipurpose interface for communication over a ethernet, ISDN and/or other networks. Access to the Internet can be provided through the network interface 216.

It is noted that a computer 200 may include different items than those noted in the described embodiment. For example, I/O ports for interfacing with printers and plotters, a floppy disk drive, a CD ROM drive, and various other features may be included, and various elements may be excluded. Also, although Internet access is described in connection with a network interface card, a modem connected to a conventional phone line can be used to access the Internet, such as through an internet service provider. The ordinarily skilled artisan will recognize the various alternatives for the computer 200.

Still referring to FIG. 2, the memory 206 also will include an operating system 220 and a zooming engine 222. The operating system 220 is a program that is typically loaded from the long term data storage device 208 (e.g., hard disk) to the main memory 206 during a boot up sequence. The operating system 220 manages the other programs in the computer, which are referred to as applications, and includes particular instructions and operations that can be used by the applications, either directly or through an application program interface. The operating system 220 also handles exchanges to and from devices connected to the computer (e.g., printers, disk drives, etc.), manages memory use, and allocates computing resources in multitasking environments.

The zooming engine 222, which will be described with more particularity below, includes instructions for updating the display 130 according to user and system input, including the zooming functionalities described in connection with the invention. For example, the zooming engine 222 manages the various zooming objects that may be provided in a zooming space, determines the available display space, determines which zooming objects are visible in the available view space, and responds to various events to update the display, such as mouse and keyboard events which arise in response to the user's navigation of the zooming space. Preferably, the zooming engine 222 is provided as software, although all or part of the zooming engine 222 may be provided as hardware, firmware, or a combination of software, hardware and firmware.

In the preferred embodiment, the system 100 utilizes a known computer operating system, such as UNIX®, WINDOWS95® or WINDOWS98®, found resident in area 220 of memory 206. When implemented as a set of instructions for a computer processor, the method of the invention is written in the Java® programming language, and the instructions, including the Java® virtual machine, can be found resident in area 220 in the memory 206 of the system 100. The Java® virtual machine, an abstract specification for a computing device, operates as an interface between the Java® application and the specific computer platform (e.g. Intel, Apple) on which the application is to be run. As is known in the art, Java® is a platform independent, object oriented programming language, the details of which are fully described by Sun Micro Systems, Inc. at its Internet web site.

Alternatively, the system may include hardware and software operable to permit communication with the World Wide Web or with a local network. In that case, the software would include a Java® enabled browser, such as Netscape Navigator™. This enables the system 100 to run the instruction set received through the network interface 216 from a web site where the platform independent language instruction set resides.

Zooming Engine

Figure 3:
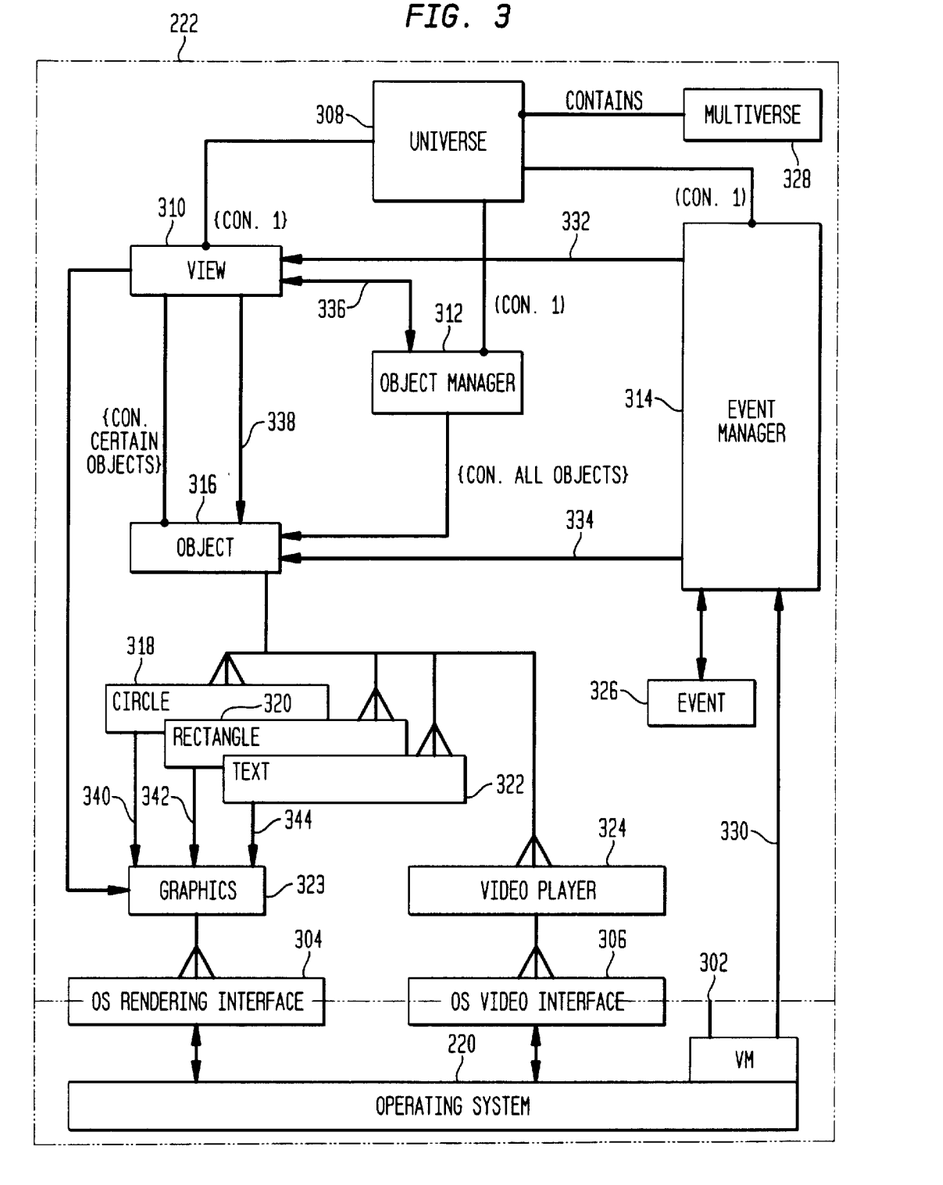
FIG. 3 is a block diagram illustrating an embodiment of a zooming engine in accordance with the invention.

The block diagram of FIG. 3 illustrates an embodiment of a zooming engine 222 architecture for facilitating zooming graphical user interface functionalities such as those contemplated by the method of the invention. Preferably, the zooming engine 222 operates with an operating system 220, as described above, and includes various instructions which are executed by a CPU for providing the zooming graphical user interface functionality.

Although various alternatives will be recognized once instructed according to the present invention, the preferred zooming engine 222 implements an object oriented architecture wherein multiple similar objects (such as zooming objects) can be part of the same class and inherit common functionalities.

Additionally, although the zooming engine 222 may operate in any environment which facilitates the execution of instructions, including platform dependent ones, the preferred zooming engine 222 embodiment is generally platform independent, running on a virtual machine 302. The preferred zooming engine 222 embodiment is implemented in the Java® programming language and the virtual machine (VM) 302 is a Java® VM. Interfaces 304, 306 between the zooming engine 222 and operating system 220 may also be provided, such as those for rendering graphics 304 and video 306 using the operating system 220. These interfaces 304, 306 may comprise conventional facilities for interfacing with the operating system 220 such as dynamic link library (DLL) files, and/or the Microsoft DirectDraw and DirectShow SDK for the WINDOWS environment.

Universe Module Defining a Single Zooming Space

The zooming engine 222 includes a universe module 308 which is the highest level module corresponding to a given zooming space. The universe module 308 contains a view module 310, an object manager module 312, and an event manager module 314. These modules 308-314 include instructions which, when executed, perform the various functions described in connection with them. Objects corresponding to a defined class can be referred to by the name of the module. For example, objects corresponding to the view manager module 310 can be referred to as a view manager object 310 or simple a view manager 310. Although the modules 308–314 (as well as the additional submodules directly or indirectly associated with them) will likely be provided as software, their functionality may also be produced by using hardware or firmware. Preferably, the modules 308–314 are implemented using Java® singleton class definitions which allow for only one instance of a class to be created. Of course, other embodiments can include multiple instances of these objects.

Referring again to the object manager module 312, that module controls all of the objects in a zooming space, which zooming objects are defined by the zooming object module 316, and subclasses thereof, such as round button module 318, rectangle module 320, text module 322, and video player module 324. The zooming object 316 is the base class for zooming objects that reside in a zooming space and are displayed in a zooming view. Objects available for zooming in zooming space may include graphical objects having particular sizes, shapes and colors, complex still images, video images, or any other type of object which may be displayed within the zooming space. Image objects may be photographs provided in conventional formats such as without limitation: JPEG, GIF, BMP, FlashPix, and others. Video objects may comprise standard video such as AVI, Quicktime, MPEG, and others. Objects also may comprise input tables and forms. The above listed zooming objects and object formats are for illustrative purposes and are by no means exhaustive. Various alternative objects and object formats readily substitutable for those listed will be recognized by the ordinarily skilled artisan.

In addition, branches, such as those shown between the zooming object module 316, and the further subclasses 318–324, indicate that multiple instances of each subclass may be instantiated. For example, there may be more than one round button object, with each round button object inheriting the characteristics of the superclass zooming object module 316, as well as from round button module 318. Further, there may be other relationships which need not be shown for an understanding of the invention. For example, the zooming object module 316 could have a quadrilateral module as a subclass, which in turn could have square module and rectangle module subclasses.

The zooming engine 222 may interface with various operating systems 220. Where this is the case, the graphics module 316 interfaces the zooming engine 222 to the appropriate OS rendering interface 304. Similarly, there may be various different video player modules 324, which in turn may be ported to various operating system 220 interfaces. Alternatively, the zooming engine 222 may operate as a more pure Java® embodiment which does not require the specific rendering and video interfaces in order to operate with a particular operating system 220.

The event manager module 314 produces event objects 326 responsive to system events (arrow 330) such as mouse and keyboard events initiated by the user. The event objects 326 are then passed, along with event handling information, to the view module 310 (arrow 332) and/or the zooming object module 316 (arrow 334) so that the display can be appropriately updated.

The view module 310 contains at least one set of zooming objects selected from those in the zooming space, through request and receipt (arrow 336) of information about the zooming objects from the object manager 312. Typically, the view module 310 contains those zooming objects which reside in the main zooming view. They may be associated to the same index used by the object manager 312. This allows the various objects in a view to be separately organized in the view module 310, so that separate calls to the zooming object module 316 are not required. For example, the view module 310 can issue commands (arrow 338) which are propagated through the object module 316 and any relevant subclass modules to affect rendering of many zooming objects contained in the main zooming view.

Individual or groups of zooming objects maybe separately targeted for update responsive to event information passed directly to the zooming object module 316 by the event manager 314, and rendering commands would be more directly issued by the objects, such as is depicted by arrows 340–344. An example of such an update could be a response to user selection and manipulation of a single object.

Multiverse Module Defining Multiple Zooming Spaces

The illustrated universe module 308 and all of its submodules pertain to a single zooming space. Multiple instances of zooming spaces may be provided, as the multiverse 328 may contain numerous zooming spaces which would each comprise its own universe module 308 and appropriate submodules. All objects (instances of a class/module) are associated with a particular universe and access to variables corresponding to a particular universe granted according to a universe identification. In this manner, the zooming graphical user interface of the invention is able to create a unique unshared address space in a single virtual machine for each universe object and its corresponding sub-objects. Thus, a user may instantiate multiple unique zooming universes in a single virtual machine, allowing display of several unique zooming spaces at one time. Such a multiverse facility is described further in the above referenced application Ser. No. 09/240,905 entitled "Singleton/Universe Based Zooming Space for Graphical User Interface."

Damage Handling

A zooming object in a zooming space may be modified either manually by a user or automatically, for example, in accordance with an application program. In either case, it will be necessary to repaint or re-render the zooming space so that the modifications become visible to the user. This operation is often referred to as damage handling. Upon such a request for a repaint of a zooming space, many prior art computer systems inefficiently calculate the display region that is to be re-rendered. Such action tends to be unnecessarily computationally-intense, thereby resulting in slower response times to subsequent manipulation operations as well as slower refresh frame rates.

In order to reduce response time for zooming operations, the present invention sets forth a novel damage handling method for selectively calculating display parameters for a modified display region. The modified display region is limited to those portions of a zooming space affected by the current series of manipulation operations and modified display parameters are only calculated a single time, after the series of manipulations are is finished. The invention operates in connection with an object oriented zooming application or zooming engine of the type previously described in conjunction with FIG. 3. Zooming engines of that sort have variable data that may be altered by user manipulation of a graphical display. Thus, as would be understood by those skilled in the art, the invention requires the use of modifiable graphical objects, such the previously described graphical objects 318–324.

A zooming object may be multiply modified before the zooming object needs to be re-rendered. More specifically, in accordance with the invention, one or more sets of changes to a zooming space may be processed before any of the changes are made apparent to the user. In order to implement the invention, zooming objects within the zooming engine maintain certain representational data or snapshot data in memory. This snapshot data is essentially a backup copy of certain instance variables which determine visual characteristics of a zooming object, such as whether and where the zooming object is visible. For example, snapshot data for a zooming object may include attributes identifying coordinates for a bounding box, a minimum displayable zoom level, a maximum displayable zoom level, and a display layer identifier. A bounding box is defined as the smallest of a predetermined geometric shape that circumscribes the object. The intersection of the location of a user interactive event and the bounding box of a zooming object determines whether a zooming object is affected by the user manipulation. In a preferred embodiment, the bounding box is a rectangle although, since the zooming object class has no geometry of its own, a variety of shaped bounding boxes may be used by the invention. Zoom levels indicate the range of levels at which a zooming object is visible. The layer identifier of an object enables a semantic ordering of objects positioned on a zooming surface.

Figure 4:
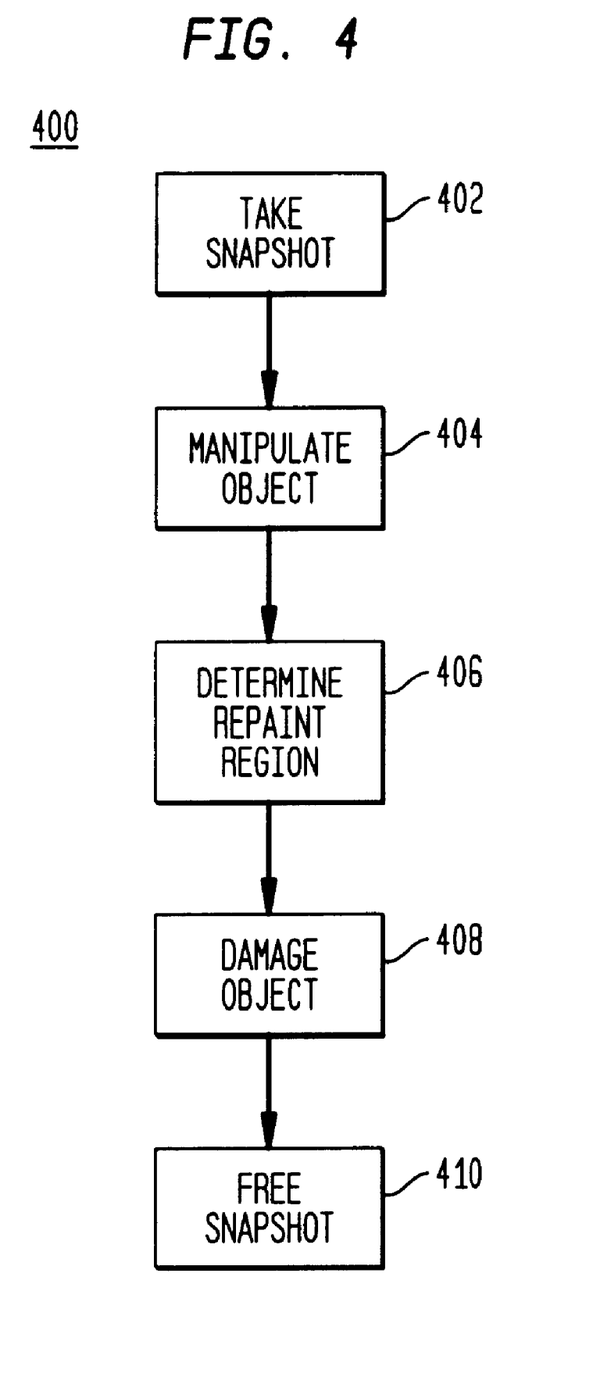
FIG. 4 is an exemplary flow chart illustrating damage handling in accordance with the invention.

In accordance with the invention, each object manipulation that results in a change to any of the snapshot data of a zooming object invokes a damage handling method. Referring to FIG. 4, a generalized flow diagram 400 for damage handling in accordance with the invention is shown. As a first step 402 in the damage handling of a zooming graphical object, where a particular object is called in anticipation of a modification thereto, snapshot data is obtained for that particular zooming object. This step 402 involves a determination of whether snapshot data (a "snapshot") exists and if the snapshot is valid for the particular zooming object in question. If a snapshot for the object does not exist or if the snapshot is invalid, a new snapshot is taken, where the snapshot data is stored in a particular location of computer memory. As a further step of determining the snapshot of a particular object, it is determined whether the object is a member of a group and if so, the snapshot data is made available to and stored for each parent group(s). Subsequent to the storing and/or forwarding of the snapshot data, the graphical object may be manipulated, thereby resulting in a modification to the object and the zooming space at step 404. Such action necessitates the re-rendering of the zooming object and/or zooming space in order to make the modification caused by the user manipulation apparent on the display. As would be understood by a person skilled in the art, a calling application, from, for example, either a user or a program, must damage the particular graphical object in order for the changes to correctly appear in the zooming space defined by the universe. This action would cause a portion of the view (the area of the zooming space shown on the display) to be repainted. According to the invention, the call to the damage method is accomplished implicitly by setting a flag so that the damage method is automatically called or explicitly by directly calling a damage method.

Referring again to FIG. 4, a next step 406 in the general damage handling processing is to determine the repaint region when the snapshot indicates that an attribute of the particular object was modified. In one embodiment of the invention, in order to determine whether the bounding box was modified, the references (in this case coordinates) to the current object data and the snapshot data are temporarily swapped and compared. If there has been a change in the bounding box for the particular object, the region manager of the zooming engine determines the repaint regions from the snapshot (i.e., old) bounding box and the current (i.e., new) bounding box. The repaint region according to the damage handling process of the invention is a bounding box that circumscribes the bounding boxes of the current object data and the snapshot data. In the exemplary embodiment, the region to be repainted is determined by the smallest absolute coordinate and the largest absolute coordinate contained in either the snapshot data or current data bounding boxes relative to a reference point. Typically, the origin of the coordinate system is the reference point, where the smallest absolute coordinate (i.e., the point closest to the origin) and the largest absolute coordinate (i.e., point farthest from the origin) taken from either of the two bounding boxes would define a damage region for a particular object in a damage handling event. Other methodologies for determining a damage region would also be readily known to those skilled in the art.

In a fourth step 408, the repaint region is re-rendered through call to the operating system renderer. Either a singular modification or all modifications previously stored in the region manager may be rendered. Lastly, in a fifth step 410, snapshot data is released after rendering, for example, by resetting a flag in the snapshot data to the not-exist/not-valid state. The freeing of snapshot data also operates to reset the corresponding snapshot in the parent groups of the zooming object in question.

Figure 5:
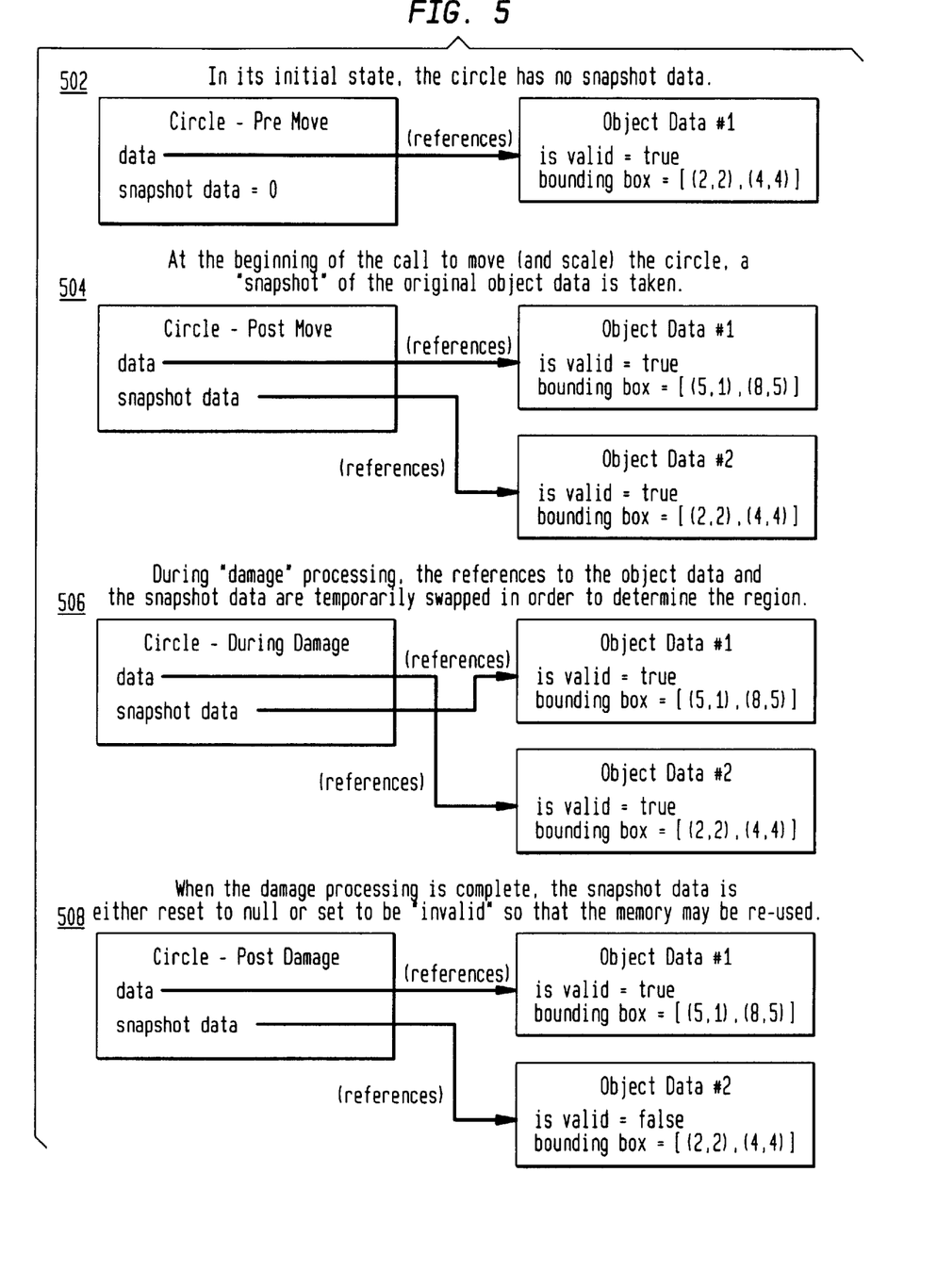
FIG. 5 is an exemplary illustration of snapshot data for a zooming object in the various steps of the damage handling method of the invention.
Figure 6:
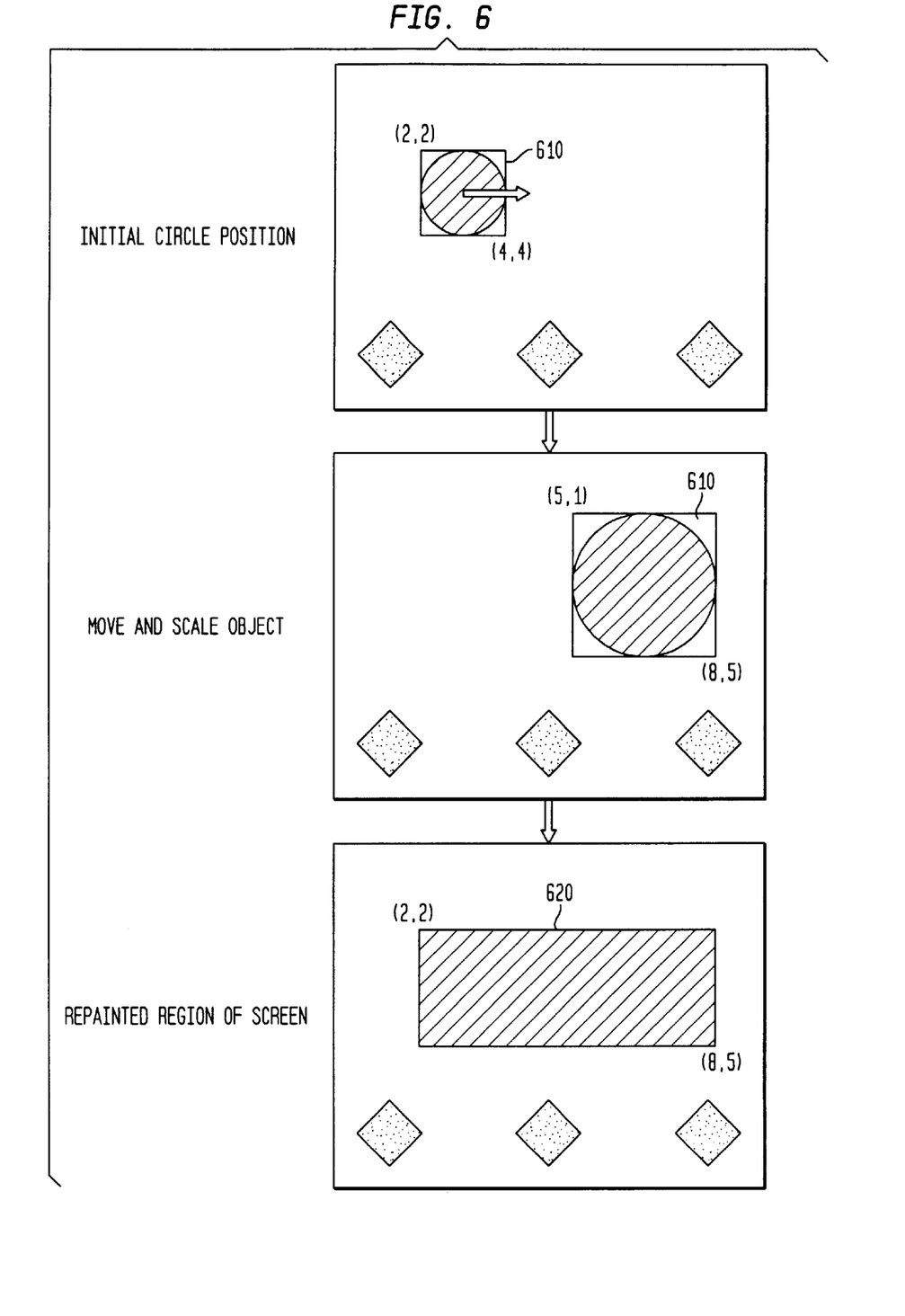
FIG. 6 is an illustrative example of an object in a zooming space as would be reflected for snapshot based damage handling in accordance with the invention.

Referring to FIG. 5 and FIG. 6 in combination, there is shown respectively an illustration of snapshot data and a corresponding illustration of a zooming object in a zooming space as would be reflected for snapshot based damage handling of a graphical object in accordance with the invention. In FIG. 6, a graphical object, namely a circle 610, is shown at step 502 in its pre-modification or pre-move state. In the pre-move state (as shown in FIG. 5) the circle has no snapshot data and the current coordinates of the bounding box of the circle are (2,2) (4,4). Corresponding to step 504, at the beginning of a call to move and scale the circle, a snapshot of the original object data is taken and stored in memory. For the exemplary case depicted in FIG. 5, the snapshot data references object data #2 and the current object data references object data #1. As can be seen in step 504, the current coordinates for the bounding box of the circle are (5,1) (8,5) and the snapshot coordinates for the bounding box of the circle are (2,2) (4,4). During damage processing (step 506) the references to the current object data and the snapshot data are temporarily swapped in order to determine the repaint region in the zooming space, if the object is to be displayed. As described above, the preferred embodiment determines the repaint region from the smallest and largest absolute coordinates of the bounding boxes of the snapshot data and current object data. In the illustrated example, the smallest absolute coordinate, as found in the snapshot data bounding box, is (2,2) and the largest absolute coordinate, from the bounding box of the current object data, is (8,5). Accordingly, the region 620 circumscribed by a rectangular bounding box having these two coordinates is the area to be repainted by the damage handling method of the invention. When the damage processing is complete, as shown in step 508 of FIG. 5, the snapshot data is set to be invalid so that the memory may be reused. As is known in the art, the snapshot data alternatively may be modified to indicate that the memory may be reused (i.e., "garbage collected"). For instance, the snapshot data may be set to the null object. In a similar manner, modified display parameters for a region of zooming space in need of re-rendering will be calculated upon the conclusion of any discrete series of related user manipulations which cause modification to any visual characteristic of a zooming object for which snapshot data previously has been stored.

Figure 7A:
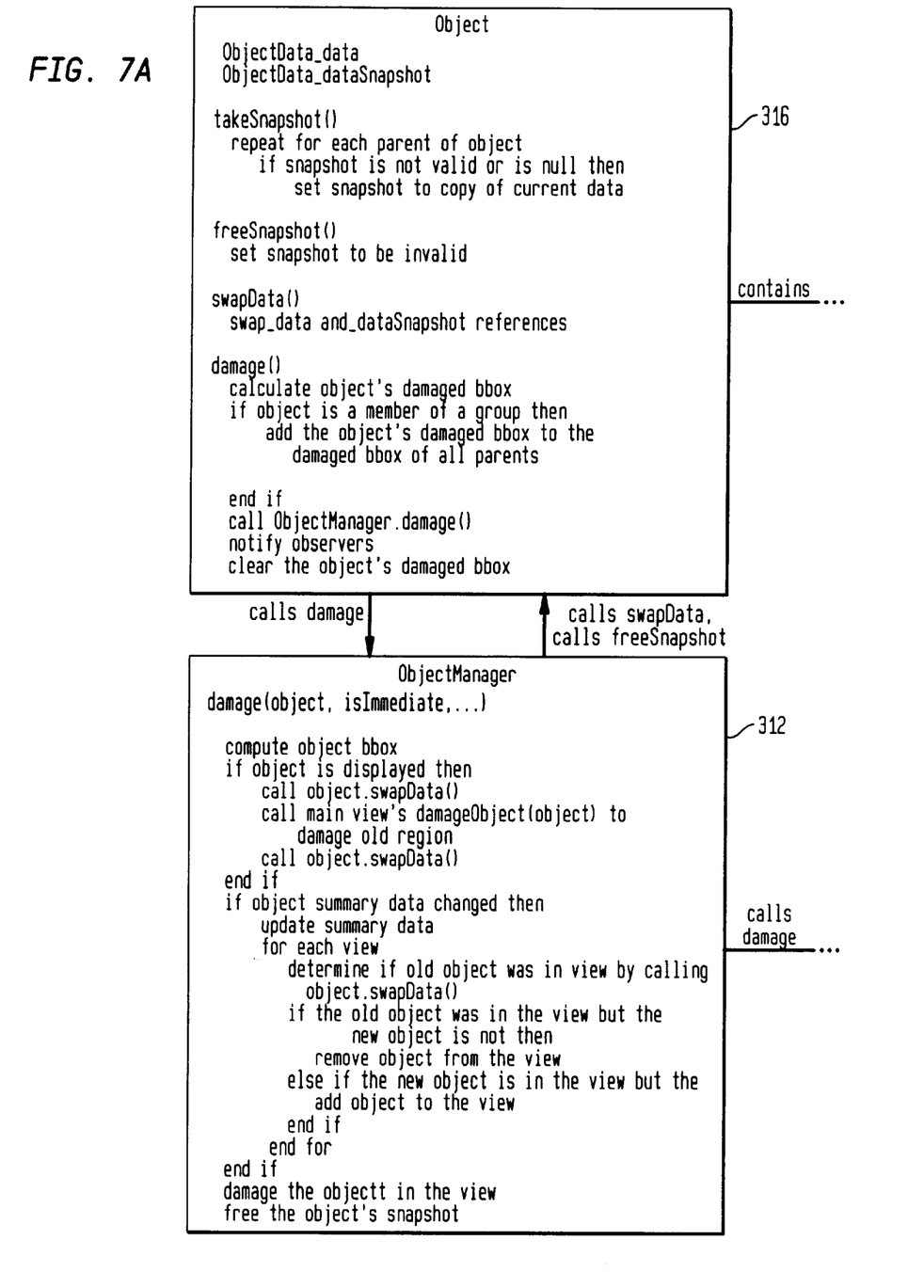
FIG. 7 is a block diagram illustrating an embodiment of a damage handling processing implemented in a zooming engine in accordance with the invention.
Figure 7B:
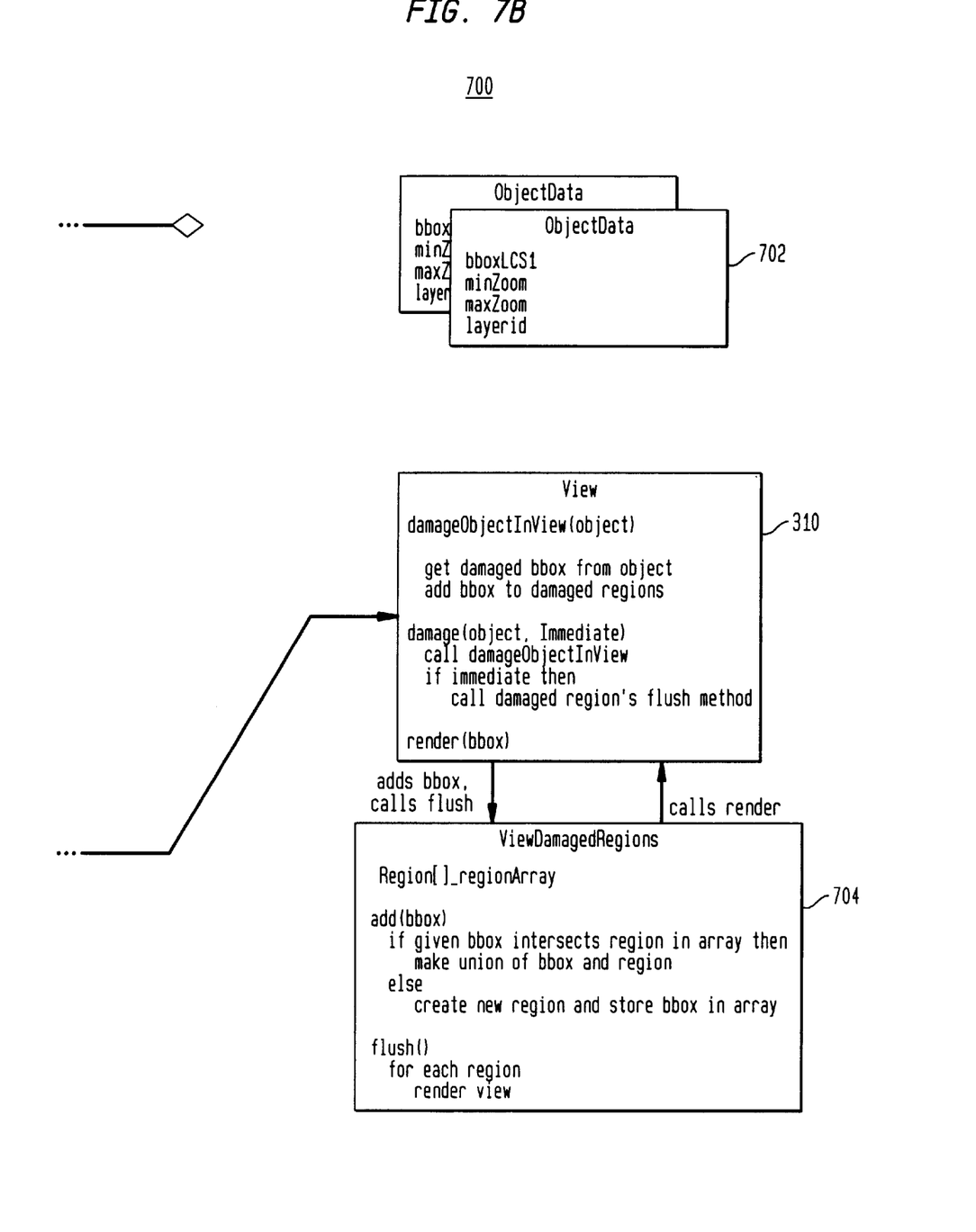

Referring to FIG. 7, there is shown an exemplary embodiment 700 of the damage handling processing of the invention as it may be implemented in a zooming engine of the type described in FIG. 3. In FIG. 7, the object module 316, the object manager module 312, and the view module 310 are illustrated including exemplary routines that implement the invention. As described previously, the object module 316 will provide the definition of certain attributes and functionalities common to all zooming objects displayed within a zooming universe. In order to provide the damage handling contemplated by the invention, an instantiated zooming object may include current object data and snapshot data. The object module also includes takeSnapshot( ), freeSnapshot( ), swapData( ), and damage( ) methods.

The takesnapshot( ) method fixes snapshot data as a copy of at least one instance variable of the current object data if the snapshot data is non-existent or non-valid. As discussed, in the exemplary embodiment of the invention, the snapshot data for an object includes but is not necessarily limited to coordinates that define a bounding box, minimum and maximum displayable zoom levels, and a display layer identifier. This method is repeated for each parent object to which the zooming object belongs. Instantiations of objectdata 702 as defined by the objectdata module provide instance variables for the storage of snapshot data and current object data for a zooming object. The freeSnapshot( ) method sets a flag of the snapshot data to be invalid or the snapshot data to the null object to indicate that the corresponding memory is no longer needed. This method is usually called after a recalculation of the display area encapsulated by the bounding box determined from the snapshot data so that the memory used to store the snapshot data will be garbage collected by the virtual machine. The swapData( ) method swaps the references for the snapshot data and the current object data for the object in question. The damage( ) method of the object module calculates the object's damaged bounding box (the bounding box of the above-described selectively limited area that is re-rendered according to the invention). If the object is a member of a group, then the damaged bounding box is added to the damaged bounding box of all the parents. As shown, the object module 316 may also call a damage method of the object manager 312, notify observers and then clear the object's damaged bounding box.

The object manager 312 includes a damage(object, is immediate, . . . ) method. This method first computes the object bounding box. If the object is displayed, then several methods are called. First the swapData method is called from the object module. The damageObjectInView(object) method of the view module 310 will then be called to damage the old region in question. The swapData method of the object module 316 is then called again in order to toggle the references in the snapshot data and the current object, where as discussed the object bounding box can be determined by comparison of both sets of coordinates. The routine next determines if any snapshot data for the object has changed. If the snapshot data has changed, then the summary data for each view is updated. In order to accomplish the update, for each view, it is determined if the old object was in the view by calling the swapData method of the object module. If the old object was in the view, but the new object is not, then the object is removed from view. On the other hand, if the new object is in the view, but the old object was not, then the object is added to the view. In accordance with the damage( ) method of the object manager 316, the object in the view will then be damaged and the object's corresponding snapshot will be freed. As can be seen, the object manager module makes calls to swapData and freeSnapshot of the object module and also makes calls to the damage routine of the view module.

As shown in FIG. 7, the view module 310 includes a damageObjectInView(object) method, a damage(object, immediate, . . . ) method, and a render(bbox) method (bbox is shorthand notation for the coordinates of a bounding box). The damageObjectInView(object) method calculates the damaged bounding box of the passed zooming object and adds the display area for this region list of damaged regions. The damage (object, immediate) method calls the damageObjectInView method and if the immediate flag or other indicator is set, then a call is made to the damaged regions flush method which renders a view for each damaged region stored by the region manager. A render(bbox) method is also included in the view module which according to its name renders the given bounding box with which it is called. The view module makes calls to the add(bbox) method and flush method of the ViewDamagedRegions module 704. The damage (object, immediate) method and the render(bbox) method of the view module may be called upon, respectively, by the object manager module and the view damaged regions module.

The ViewDamagedRegions module 704 operates on regions which include region arrays. This module includes two methods, add(bbox) and flush( ). The add(bbox) method makes a union of a bounding box and a region if the given bounding box intersects a region in the array. If the bounding box does not intersect a region in the array, then a new region is created and the bounding box is then stored in the array therefor. The flush( ) method renders a view for each region it is called upon to render.

CONCLUSION

There has been described and illustrated herein, a computer interface for manipulating zooming objects in a zooming graphical user interface using an efficient damage handling method that reduces that data processing demand on the computer system hosting the interface. The interface allows information displayed as a zooming universe of graphical objects to be manipulated with interactive input devices. The region re-rendered to make apparent the results of user manipulations is calculated once, after user manipulation of an object. Data processing is limited by checking for a modification from snapshot data, which stores at least one visual attribute of the zooming object prior to user manipulation. The region to be re-rendered is further limited to a bounding box that circumscribes the bounding boxes of the snapshot data and the current object data. Timing of the damaging necessary to make the result of user manipulation apparent by explicitly calling a damaged method. As described, the interface is implemented using an object-oriented platform-independent programming language and is both portable and modular while at the same time providing increased flexibility, efficiency and functionality.

It is to be understood that the invention is not limited to the illustrated and described forms of the invention contained herein. It will be apparent to those skilled in the art that various changes may be made without departing from the scope of the invention and the invention is not considered limited to what is shown in the drawings and described in the specification.

What is claimed is:

1. A method of visually rendering a result of manipulation of a representation object in a zooming space, wherein said representation object is characterized by a variable defining a visual characteristic, and wherein a plurality of said representation objects are associated in parent groups of said zooming space, the method comprising the steps of:

obtaining snapshot data for a first representation object prior to a manipulation of said first representation object;

determining a repaint region after said manipulation of said first representation object based on a comparison of the snapshot data for the first representation object with current data for the first representation object; and computing visible display parameters for said repaint region.

2. The method of claim 1 further comprising the step of:
determining whether said manipulation has resulted in a modification to the visual characteristic of said first representation object and necessitated said step of determining a repaint region and said step of computing visible display parameters.

3. The method of claim 1 further comprising the step of:
damaging said visible display parameters for said repaint region.

4. The method of claim 3 wherein said step of damaging is accomplished by setting a flag so that a damage method is automatically called.

5. The method of claim 3 wherein said step of damaging is accomplished by directly calling said damage method.

6. The method of claim 1 further comprising the step of:
freeing said snapshot data.

7. The method of claim 6 wherein said step of freeing said snapshot data comprises the step of:
resetting said snapshot data from a second state to a first state.

8. The method of claim 6 wherein said step of freeing said snapshot data further comprises the step of:
resetting corresponding snapshot data in each representation object associated with said parent groups of said first representation object.

9. The method of claim 1 further comprising the step of:
accumulating said repaint region for each of a plurality of discrete manipulations of representation objects using a region manager.

10. The method of claim 1 wherein said step of obtaining snapshot data comprises the steps of:
making a copy of said at least one variable defining at least one visual characteristic of said first representation object when said snapshot data for said first representation object is in a first state, wherein said step of making a copy alters said snapshot data from said first state to a second state;

making said snapshot data available to said parent groups of said first representation object; and making a copy of said at least one variable defining at least one visual characteristic for each representation object associated with each said parent group when said snapshot data for each said representation object associated with each said parent group is in a first state, wherein said step of making a copy alters said snapshot data from said first state to a second state.

11. The method of claim 1 wherein said snapshot data is selected from the group comprising bounding box coordinates, minimum displayable zoom level, maximum displayable zoom level, and display layer identifier.

12. The method of claim 1 wherein said at least one variable defining at least one visual characteristic of said representation object is current data and wherein said step of determining a repaint region after said manipulation; comprises the steps of:

comparing said current data and said snapshot data to determine if said representation object has been modified; and computing a bounding box that circumscribes an area of said zooming space when said representation object has been modified.

13. The method of claim 12 further including the steps of:
swapping said current data and said snapshot data prior to said step of comparing; and re-swapping said current object data and said snapshot data after said step of computing.

14. The method of claim 1 wherein said at least one variable defining at least one visual characteristic of said representation object is current data and wherein said repaint region is a bounding box that circumscribes said first representation object as defined by both said current data and said snapshot data.

15. The method of claim 1 wherein said at least one variable defining at least one visual characteristic of said representation object is current data and wherein said repaint region is a bounding box defined by a smallest absolute coordinate and a largest absolute coordinate of a bounding box, wherein said absolute coordinates are contained in either said current data or said snapshot data.

16. A zooming engine for visually rendering a result of a manipulation of a zooming object in a zooming space, the zooming engine comprising:

a plurality of said zooming objects, each of said zooming objects containing visual characteristic data including snapshot data and current data, wherein each of said zooming objects is able to manipulate said visual characteristic data;

an object manager for determining the occurrence of said manipulation to one of said zooming objects and determining a display region affected by said manipulation based on a comparison of the snapshot data obtained prior to said manipulation with the current data;

a region manager for accumulating said display regions affected by a plurality of discrete manipulations and for rendering said display regions; and a view manager for computing visible display parameters for said display regions and rendering said display parameters in a visible display area, interfacing said object manager and said region manager.

17. The zooming engine of claim 16 wherein said region manager is operative to determine the union of a given display region and display regions previously stored by said region manager.

18. The zooming engine of claim 16 further comprising:
an event manager responsive to user interaction for creating an event to notify said zooming objects and said object manager of said manipulation.

19. The zooming engine of claim 18 wherein said visual characteristic data of one of said zooming objects is altered from a first state to a second state in response to said event.

* * * * *

UNITED STATES PATENT AND TRADEMARK OFFICE
CERTIFICATE OF CORRECTION

PATENT NO.   : 6,366,294 B1
DATED        : April 2, 2002
INVENTOR(S)  : Kathleen Cunningham and Kenneth Herndon It is certified that error appears in the above-identified patent and that said Letters Patent is hereby corrected as shown below:

<u>Column 13,</u>
Line 25, "takesnapshot" should read -- takeSnapshot --

<u>Column 14,</u>
Line 52, "results" should read -- result --.
Line 61, after apparent, insert -- is also selectively controlled. One or more sets of modifications may be made to the displayed zooming space and stored by a region manager before any modifications are made apparent --

Signed and Sealed this

Twenty-ninth Day of October, 2002

*Attest:*

*Attesting Officer*

JAMES E. ROGAN
*Director of the United States Patent and Trademark Office*